Aug. 6, 1940.  S. A. SNELL  2,210,100
MECHANISM CONTROL
Filed Nov. 6, 1936
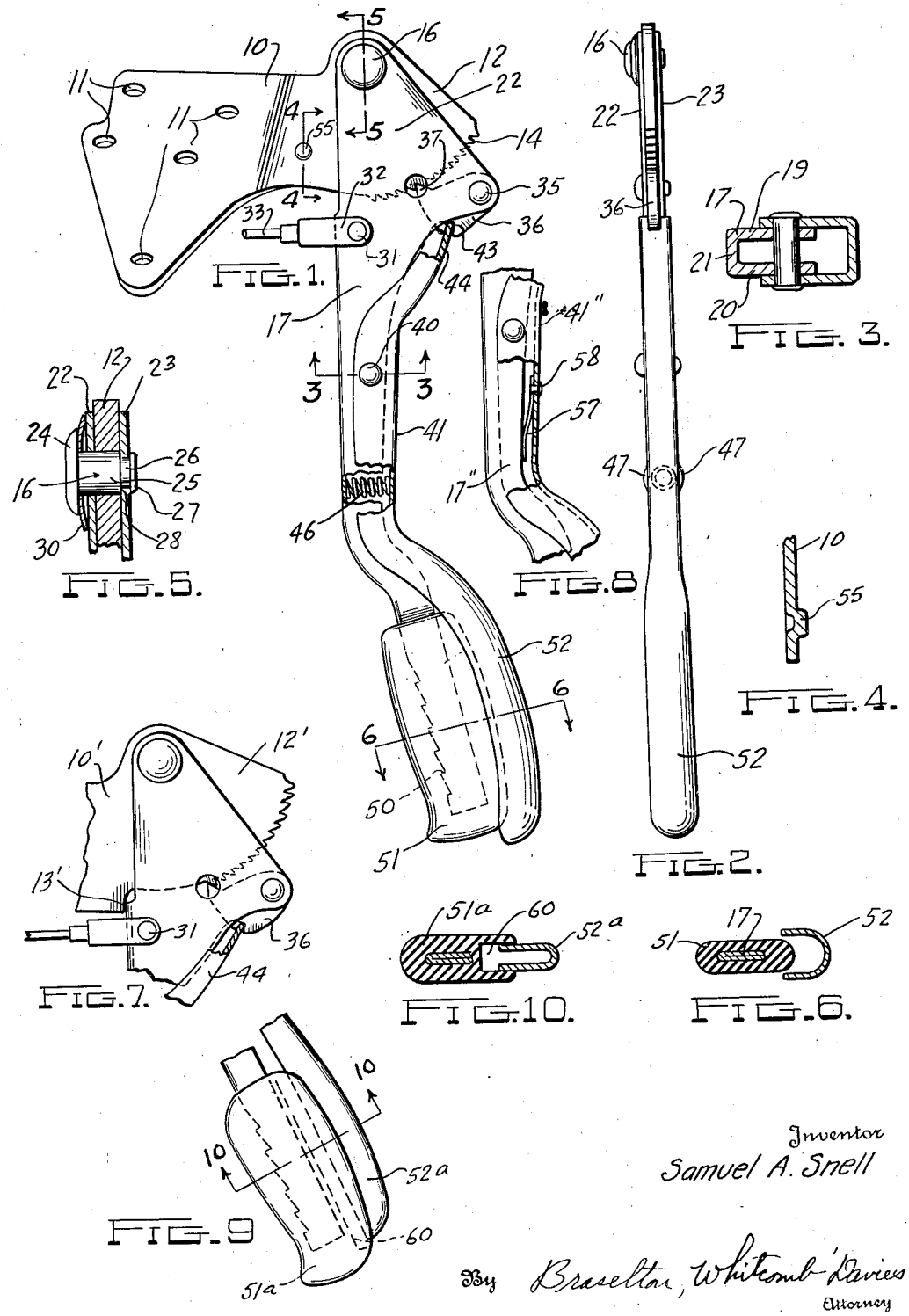
Inventor
Samuel A. Snell
By Braselton, Whitcomb Davies
Attorney Patented Aug. 6, 1940

2,210,100

UNITED STATES PATENT OFFICE 2,210,100

MECHANISM CONTROL

Samuel A. Snell, Toledo, Ohio, assignor, by mesne assignments, to The Logan Gear Company, a corporation of Ohio Application November 6, 1936, Serial No. 109,563

10 Claims. (Cl. 74—537)

This invention relates to mechanism control and particularly to mechanism of a character especially adapted for vehicle controls or other apparatus.

The invention contemplates the provision of a lever mechanism embodying a clutching means for positively holding or retaining a lever member in desired position.

The invention has for an object the provision of a lever arrangement especially adapted for actuating the braking mechanism of an automotive vehicle wherein a clutching member for retaining the lever in brake setting or locked position is connected to a releasing member in such a manner that when the lever member is moved rapidly toward brake setting position the noise set up by the tooth of the clutch overriding teeth of the sector is substantially decreased over prior devices as the inertia of the clutch releasing member to follow each movement of the clutch or pawl tends to prevent the pawl from engaging in complete successive enmeshment with each tooth of the sector during movement of the lever member.

Another object is the provision of lever mechanism of this character having means connecting the lever with its supporting member in such a manner that inaccuracies in the thickness or dimension of the several connected parts are compensated for automatically as well as to at the same time maintain a substantially predetermined degree of friction between the lever and its supporting element.

Another object of the invention is the provision of an emergency brake actuating lever arrangement particularly adapted to be mounted at the rear of the instrument panel of a vehicle whereby the mechanism is at all times in convenient position for use by the operator.

Another object of the invention resides in the arrangement of pawl and pawl release mechanism and the simple yet effective positive connection between these elements, the arrangement embodying enclosed spring means cooperating with the pawl release member yet effective to urge the pawl into enmeshment with a clutching surface.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of a mechanism control of my invention;

Figure 2 is a front elevational view of the arrangement shown in Figure 1;

Figure 3 is a transverse sectional view taken substantially on the line 3—3 of Figure 1;

Figure 4 is a fragmentary sectional view taken substantially on the line 4—4 of Figure 1 showing one form of stop means for limiting the movement of the lever mechanism in one direction;

Figure 5 is an enlarged vertical sectional view taken substantially on the line 5—5 of Figure 1;

Figure 6 is a transverse sectional view taken substantially on the line 6—6 of Figure 1;

Figure 7 is a view illustrating the upper portion of the lever arrangement and a support having a modified form of stop means;

Figure 8 is a fragmentary view showing a modified form of resilient means for urging the clutch means toward engagement;

Figure 9 is a view showing the lower end of a lever arrangement illustrating a modified form of hand grip portions of the lever member and clutch releasing member;

Figure 10 is a transverse sectional view taken substantially on the line 10—10 of Figure 9.

While I have illustrated my invention of a configuration particularly adaptable for controlling emergency brakes of an automotive vehicle, it is to be understood that I contemplate the use of mechanism control wherever the same may be found to have utility.

Referring to the drawing in detail, I have illustrated a form of the invention inclusive of a support or member 10 provided with a series of openings 11 adapted to receive rivets, bolts, or other securing means for holding the support to the vehicle structure, the arrangement being preferably positioned adjacent the dash board of a vehicle and to the rear of the instrument panel (not shown), as this provides a position for the mechanism control within convenient reach of the operator. The support or member 10 is preferably formed or provided with a uniplanar portion 12, one edge of which is provided with a clutching surface, that specifically illustrated being in the form of a serrated or grooved edge to form ratchet or clutch teeth 14.

The upper portion of the uniplanar portion 12 is bored to receive a pivot pin 16 which acts to pivotally connect a lever or lever member 17 to the support. The lever member in the form illustrated is preferably fabricated of sheet metal and is generally of U-shape configuration in cross section, as shown in Figure 3, having side wall portions 19 and 20 connected by a web portion 21, which U-shaped configuration lends stiffness and rigidity to the arrangement. In the form illustrated, the web portion 21 terminates just beneath the lower edge of the uniplanar portion 12 of the support, the side walls of the lever projecting upwardly in the form of projections 22 and 23 straddling the uniplanar portion 12. The projections 22 and 23, as particularly illustrated in Figure 5, are provided with axially aligned openings to receive the pivot pin 16. The pin 16 is provided with an enlarged head portion 24, a central cylindrical portion 25, and a reduced tenon 26. The openings in the projections 22 and 23 are of a size to snugly receive the portions 25 and 26 of the pin, the extremity of the tenon portion being swaged after assembly of the parts, as shown at 27, to hold the lever and support in assembled relationship. It is to be noted that a shoulder 28 separating the portions 25 and 26 of the pin rests against the inner wall of projection 23. Interposed between the outer wall of projection 22 and the head 24 of the pin is a cupped or spring washer 30 which serves dual purposes, viz., to at all times maintain a substantially constant degree of friction between the portions of the lever and the support, and to compensate for any inaccuracies in the thickness of the support and the projection 22 of the lever member. By employing a resilient means of this character, the thickness of the support and side wall of the lever may vary without affecting the proper functioning of the lever mechanism.

The side walls of the lever member are provided with aligned openings to receive clevis pin 31 which passes through a clevis member 32, the latter in turn being connected to a cable 33 or other suitable means adapted to be operatively connected to the emergency brakes of the vehicle or other mechanism to be actuated or controlled by the arrangement of my invention.

The side walls of the lever member are also provided with registering openings adapted to receive a pin 35 upon which is journalled or pivoted a pawl or clutch member 36 preferably arranged between the side walls of the lever member, the clutch member 36 having a tooth or projection 37 adapted for cooperation with the ratchet teeth 14 of the uniplanar portion 12 formed on the support.

The side wall portions of the lever member are also provided with registering openings adapted to receive a pin 40 which serves to pivotally connect a clutch or pawl actuating or releasing member 41 to the lever member. The clutch actuating member 41 as illustrated is preferably formed of sheet metal and of U-shaped cross section which serves not only to effectually cover the major portion of the lever member, thus enhancing the appearance of the structure, but also lends strength and rigidity to the clutch releasing member. The clutch member 36 is provided with a kerf 43 which is adapted to receive the extremity 44 of the clutch actuating member so that the clutch member 36 is at all times in direct connection with the clutch actuating member. I have provided resilient means in the form of a coil spring 46 which is arranged between the connecting web portions of both the lever member and the clutch actuating member, as illustrated in Figures 1 and 2, and in which arrangement it is preferable that the side walls of both the lever member and the clutch actuating member be formed outwardly as at 47 to accommodate the spring. By this means, the spring is also maintained in a fixed position in the lever member. The spring in the embodiment illustrated, and with particular reference to Figure 1, imparts a force against the clutch actuating member in a counter-clockwise direction about its pivot pin 40, and as the upper extremity 44 of the clutch actuating member is in engagement with the kerf in the clutch member, the latter is at all times urged into clutch engaging or ratchet tooth enmeshing position.

The side walls of the lower portion of the lever member are, in the embodiment illustrated, brought into close engagement, as shown in Figure 6, and are provided on one edge with a series of ratchet shaped teeth 50 adapted to accommodate a grip portion 51 which may be of semi-hard rubber, Bakelite, or other suitable material. The clutch actuating member 41 also terminates in a hand grip portion 52 which is of concave configuration and preferably arranged to straddle the grip portion 51 as shown in Figure 6.

It is desirable to embody stop means to limit the movement of the lever in brake releasing position and to this end, as illustrated in Figures 1 and 4, a laterally extending projection 55 is struck up from the metal in the support 10, against which a rear edge of portion 22 of the lever member be engaged to limit the movement of the lever mechanism in a clockwise direction.

In the operation of the arrangement of my invention, when it is desired to actuate or "set" the emergency brakes of the vehicle, the grip portion 51 is grasped by the operator and the lever moved in a counter-clockwise direction about the pivot pin 16, the lever being held in brake setting position by means of tooth 37 of the clutch member engaging one of the ratchet teeth 14, the tooth 37 being urged toward enmeshing position under the influence of the spring 46. When it is desired to release the brakes, the grip portions 51 of the lever member and grip portion 52 of the clutch actuating member are gripped and moved together by the operator which causes the member 41 to swing in a clockwise direction about the pin 40, and through the connection of this member with the kerf 43 in the clutch member the tooth 37 is withdrawn from enmeshment with the ratchet teeth 14, after which the lever member is free to swing in a clockwise direction about its pivot 16 to effect a release of the brake mechanism. One of the features of the invention lies in the direct connection between the clutch member 36 and the clutch releasing or actuating member 41 as the usual procedure of an operator in setting the brakes would be to move the lever member counter-clockwise by gripping the portion 51 without grasping the grip portion 52 of the clutch releasing member. When the operator actuates the lever mechanism in this manner, the tooth 37 is compelled to pass each ratchet tooth of the series 14 and because of the direct connection between the clutch member 36 and member 41, the inertia or the tendency of the member 41 to resist movement causes the tooth member 37 to skip lightly over the ratchet teeth 14 as the time element does not permit the overcoming of the inertia of member 41 by the spring 46, which would otherwise compel the successive complete enmeshment of tooth 37 of each groove between the teeth of the serrated edge 14 so that the noise or clicking between the clutching elements in this form of the invention is decreased to a minimum.

An alternative form of stop means may be provided for the mechanism as illustrated in Figure 7, wherein a portion of the support 10' adjacent the uniplanar portion 12' has a shoulder 13' adapted to engage the web portion of the lever member to serve as a lever movement limiting means.

Figure 8 illustrates a modified form of resilient means for urging the clutch releasing member toward clutch engaging position, this being in the form of a plate spring 57 which may be secured by a rivet 58 to the clutch actuating member 41'', the free end of the plate spring 57 resting against the forward edges of the lever member 17''.

Figures 9 and 10 illustrate a modified form of grip portions for the lever and clutch actuating members, wherein the grip portion 51a is provided with a U-shaped longitudinal slot or opening 60 and the grip portion 52a of the lever member of U-shaped configuration and arranged as illustrated particularly in Figure 10 with the side walls of the grip portions of both elements overlapping with the side walls of the clutch actuating member within those of the lever grip member.

It is apparent that within the scope of the invention, modifications and different arrangements may be made other than is herein disclosed, and the present disclosure is illustrative merely, the invention comprehending all variations thereof.

What I claim is:

1. In combination, a mechanism control including a support having a clutching surface formed thereon; a lever member formed of sheet metal of U-shaped cross section throughout its body portion and having integrally formed parallel side wall portions straddling said support, the said parallel side wall portions being pivotally connected to the support; a pawl pivotally carried by the lever member between the parallel side wall portions thereof and adapted for cooperation with the clutching surface on said support, said pawl having a kerf in a depending edge thereof; a pawl actuating member pivotally connected to the lever member intermediate its ends, said pawl actuating member being of U-shaped cross section and having its side walls overlapping the side walls of the body portion of said lever member, said pawl actuating member having its upper extremity projecting into the kerf in said pawl; resilient means interposed between the lever member and the pawl actuating member and confined by the side walls thereof for normally acting upon said pawl actuating member to urge said pawl into engagement with the clutching surface of said support, said lever member and said pawl actuating member terminating at their lower extremities in overlapping hand grip portions.

2. In combination, a mechanism control including a supporting element having a uniplanar portion, said uniplanar portion having ratchet teeth formed upon a depending edge thereof; a lever member formed of sheet metal having spaced side wall portions straddling and pivotally connected to the uniplanar portion of said supporting element; a pawl member positioned between the side wall portions of said lever and pivotally connected thereto, said pawl being adapted for cooperation with the ratchet teeth upon said supporting element for holding the lever member in adjusted position; a pawl actuating member formed of sheet metal of substantially U-shaped cross section having the side walls thereof overlapping the side walls of the lever member and being pivotally connected to the latter intermediate its ends, the web portion of the upper extremity of said pawl actuating member extending into the kerf in said pawl; spring means interposed between the lever member and the pawl actuating member acting upon the latter to normally urge the pawl into engagement with the ratchet teeth on said supporting element, said lever having a grip portion at its lower end, said pawl actuating member also having a grip portion of U-shaped cross section coextensively arranged with the grip portion on said lever member and overlapping a portion of the grip portion upon said lever member.

3. In combination, a mechanism control including a supporting element provided with a clutching surface; a lever member formed of sheet metal; a pin extending through openings in said lever member and said supporting element for pivotally connecting said lever member to said supporting element; resilient means cooperating with said lever and pin whereby a substantially constant degree of friction is maintained between said lever and said supporting element; a lateral projection integrally struck up from said supporting element for limiting the movement of said lever member; a clutch member carried by said lever member and adapted for cooperation with the clutching surface; a clutch actuating member connected to said lever member and having engagement with said clutch member; and means acting on said clutch actuating member for urging said clutch member toward clutching position.

4. In combination, a mechanism control including a support having a clutching surface formed thereon; a lever member formed of sheet metal; a pin extending through openings in said lever member and said support for pivotally connecting said lever member to said support, said pin having a head portion; resilient means cooperating with said lever and support whereby a substantially constant degree of friction is maintained between said lever and support; stop means integrally formed on said support for limiting the movement of said lever member in one direction; a clutch member pivotally supported upon said lever member and adapted for cooperation with the clutching surface of said support, said clutch member having a slot therein; a clutch actuating member formed of sheet metal of U-shaped cross section throughout its length pivoted to said lever member, said clutch actuating member having its upper extremity extending into the slot in said clutch member; and a coil spring interposed between said lever member and said clutch actuating member and acting on said clutch actuating member for urging the clutch member into engagement with the clutching surface.

5. In combination, a mechanism control including a support having a clutching surface formed thereon; a lever member formed of sheet metal, said lever member being formed with end side portions straddling and pivotally connected to said support and the lever main body portion depending therefrom; a clutch member carried by said lever member and adapted for cooperation with the clutching surface on said support; said clutch member being formed with a kerf; a clutch releasing member formed of sheet material having spaced side walls and being pivotally connected to said lever member through said side walls; the clutch actuating member having its end portion extending into said kerf whereby movement of said clutch actuating member is positively transmitted to said clutch member; and means located between said lever member and said clutch actuating member and arranged between the side walls of said clutch actuating member for urging said clutch member toward clutching position.

6. In combination, a mechanism control including a support having a clutching surface formed thereon; a lever member formed of sheet metal; a headed pin extending through openings in said lever member and said support for pivotally connecting said lever member to said support; resilient means cooperating with said lever and headed pin whereby a substantially constant degree of friction is maintained between said lever and support; stop means formed on said support for limiting the movement of said lever member; a clutch member pivotally supported upon said lever member and adapted for cooperation with the clutching surface of said support; a clutch actuating member pivoted to said lever member and having connection with said clutch member; resilient means acting on said clutch actuating member for urging said clutch member toward clutching position, said lever member terminating in a grip portion formed with a longitudinal slot of U-shaped cross section, said clutch actuating member being formed with a manipulating portion of U-shaped configuration extending into the longitudinal slot in said grip portion.

7. In combination, a mechanism control including a support having a clutching surface formed thereon; a lever member formed of sheet metal mounted upon said support, said lever member being formed to substantially U-shaped cross section throughout a major portion of its length, the side walls projecting at one end beyond said U-shaped cross section; a clutch member pivoted on the side walls of said lever member and adapted for cooperation with the clutching surface on said support; a clutch releasing member having an end connected to said clutch member and being formed to substantially U-shaped configuration assembled in opposite relation forming a closed hollow intermediate structure wherein the side walls of said clutch releasing member and said lever are overlapping, the lower portions terminating in hand grip portions; a pin passing through the overlapping side walls of said members whereby said clutch releasing member is pivotally connected to said lever member; and resilient means partially embraced by the side walls of said lever member and interposed between said lever and clutch releasing member for urging said clutch member into co-operative engagement with the clutching surface formed on said support.

8. In combination, a mechanism control including a support having ratchet teeth; a sheet metal lever member of substantially U-shaped configuration throughout a major portion of its length, said lever member having projecting side wall portions straddling said support and pivotally connected thereto; a pawl carried by said lever member and having a projection adapted to engage the serrated portion of said support to form lever locking means; said pawl having a notch therein, a pawl releasing member pivotally connected to said lever member having an end extending into the notch in said pawl and a U-shaped lower portion, the web portions of said U-shaped configurations being in opposed relation and the side walls overlapping; and spring means enclosed by the side walls between the web portions of said members for urging said pawl into engagement with the serrated portion of said support.

9. In combination, a mechanism control including a support having a serrated portion; a lever member formed of sheet metal having an end portion straddling said support and pivotally connected thereto and a body portion of channel-shaped configuration; a pawl pivotally carried by said lever member and engageable with the serrated portion of said support; a pawl releasing member of substantially channel-shaped configuration pivotally connected to said lever member, the channel-shaped configurations of said members being in opposition forming a hollow structure terminating into a composite hand grip portion; a groove on said pawl acting as connecting means between said pawl releasing member and said pawl; and a coil spring confined by the side walls of said pawl releasing member and located between said members for urging said pawl into engagement with the serrated portion of said support.

10. In combination, a lever having a body portion; said body portion terminating at one end in a hand grip portion of U-shaped configuration; a lever retaining clutch means pivotally associated with said U-shaped portion; clutch controlling means associated with said lever and having a U-shaped configuration located in opposite relation to the U-shaped configuration of said lever, a coil spring positioned between the clutch controlling means and the body portion of the lever, the side walls of the U-shaped configuration of the clutch controlling means being formed to position and retain said spring, said clutch controlling means having a manipulating portion positioned in nested relation with the grip portion on said lever.

SAMUEL A. SNELL.